United States Patent [19]
Wada et al.

[11] Patent Number: 5,552,684
[45] Date of Patent: Sep. 3, 1996

[54] CONTROL APPARATUS FOR REVERSIBLE MOTOR AND MOTOR-DRIVEN POWER STEERING SYSTEM FOR MOTOR VEHICLE USING THE SAME

[75] Inventors: Shunichi Wada; Masanori Takagi, both of Himeji, Japan

[73] Assignee: Mitsubishi Denki Kabushiki Kaisha, Tokyo, Japan

[21] Appl. No.: 281,635

[22] Filed: Jul. 28, 1994

[30] Foreign Application Priority Data

Mar. 16, 1994 [JP] Japan .................................. 6-046021

[51] Int. Cl.$^6$ .................................................. H02P 1/00
[52] U.S. Cl. ........................... 318/293; 180/404; 180/446; 318/432; 361/33
[58] Field of Search ................................. 318/280.1, 286, 318/287, 293, 432, 434; 361/23–33, 88–93; 180/79.1, 140–143

[56] References Cited

U.S. PATENT DOCUMENTS

| | | | |
|---|---|---|---|
| 4,532,567 | 7/1985 | Kode | 318/434 X |
| 4,611,682 | 9/1986 | Yasuda et al. | 318/473 X |
| 4,765,426 | 8/1988 | Shimiza | 318/293 X |
| 4,869,333 | 9/1989 | Morishita et al. | |
| 4,918,744 | 4/1990 | Shimizu | 318/646 X |
| 4,972,133 | 11/1990 | Hirota et al. | 318/432 X |

FOREIGN PATENT DOCUMENTS 251596  9/1992  Japan .
20976   3/1993  Japan .

Primary Examiner—David S. Martin
Attorney, Agent, or Firm—Sughrue, Mion, Zinn, Macpeak & Seas

[57] ABSTRACT

A motor-driven power steering control system of a motor vehicle for assisting a driver in manipulating a steering wheel by making use of an assist torque generated by a reversible motor which is operatively coupled to a steering mechanism of the motor vehicle includes an electric reversible motor mechanically coupled to a steering system of the motor vehicle through an electromagnetic clutch, a motor drive circuit, an H-bridge switching driver circuit for driving the electric reversible motor in forward or reverse direction under the control of the motor drive circuit, and a clutch control circuit for controlling the electromagnetic clutch. A motor voltage detection circuit for detecting terminal voltages at both terminals of the electric reversible motor is provided for generating a voltage signal of high level and subsequently a fail-safe signal of a low level on the basis of the high-level voltage signal when both of the terminal voltages are approximately zero, while generating a voltage signal of low level and subsequently a fail-safe signal of high level on the basis of the low-level voltage signal unless both of the terminal voltages are approximately zero. A switch is connected between an electric power source and the switching drive circuit and the clutch control circuit. A microcomputer fetches the fail-safe signal from the motor voltage detection circuit to thereby open the switch for interrupting the power supply to the reversible motor and the clutch control circuit when the fail-safe signal is at the low level.

25 Claims, 9 Drawing Sheets

CONTROL APPARATUS FOR REVERSIBLE MOTOR AND MOTOR-DRIVEN POWER STEERING SYSTEM FOR MOTOR VEHICLE USING THE SAME

BACKGROUND OF THE INVENTION

1. Field of the Invention

The present invention relates to a control apparatus for controlling operation of a reversible electric motor while ensuring a fail-safe function for the operation of the motor. Further, the invention is concerned with a motor-driven power steering system of a motor vehicle or automobile which is adapted for assisting a driver in manipulating a steering wheel or handle by making use of an assist torque generated by a reversible motor which is mechanically coupled to the steering system. In particular, the present invention is concerned with an apparatus for controlling operation of the motor-driven power steering system of the type mentioned above, which apparatus is imparted with a capability of detecting not only a fault such as a ground fault of the reversible motor but also the occurrence of an abnormality in the control circuit therefor to protect the motor against adverse influence of such fault and abnormality. Hereinafter, the motor-driven power steering system and the control apparatus mentioned above will also be referred to collectively as the motor-driven power steering control system.

2. Description of the Related Art

In a motor-driven (or electrically driven) power steering control system for a motor vehicle, a steering torque applied to a steering wheel by a driver is detected by a torque sensor to thereby allow a reversible electric motor of the power steering system to generate an assist torque of such magnitude which is substantially proportional to the detected steering torque while taking into account the speed of the motor vehicle (hereinafter referred to as the vehicle speed), wherein the assist torque thus generated is applied to a steering shaft assembly for the purpose of aiding or facilitating the driver in manipulating the steering wheel. In the motor vehicle equipped with such motor-driven power steering control system, there may arise a very unfavorable situation for driving the motor vehicle when a ground fault occurs in the reversible motor of the steering system in the electrically energized state, because then a very large current will flow through the motor, whereby an assist torque of a magnitude which far exceeds what the driver expects will be generated. For this reason, the motor-driven power steering control system is generally equipped with a fail-safe means for detecting the occurrence of the ground fault to thereby interrupt an electric power supply to a motor driver circuit which is employed for driving the reversible motor of the power steering system.

As the motor-driven power steering control systems of the above type known heretofore, there may be mentioned those described in, for example, Japanese Unexamined Patent Application Publication No. 251596/1992 (JP-A-H4-251596) and Japanese Utility Model Application No. 20976/1993 (JP-UA-H5-20976). For better understanding of the subject matter of the present invention, description will first be made in some detail of these hitherto known control systems.

FIG. 8 is a block diagram showing generally a structure of a motor-driven power steering control system disclosed in JP-A-H4-251596. As can be seen in the figure, this prior art motor-driven power steering control system is comprised of a central processing unit 100, a drive control circuit 101, a gate driver circuit 102 for generating PWM (Pulse Width Modulated) signals, and a motor control circuit 103 constituted by controlled rectifier elements such as field effect transistors (FETs) connected in the form of a H-bridge circuit and serving as a switching means for controlling an electric motor 104 in the forward and backward rotating directions, wherein the switching operation of the motor control circuit 103 is controlled by the central processing unit 100 via the gate driver circuit 102 for thereby allowing the assist torque generating motor 104 to be rotated in the forward direction or in the backward (reverse) direction. The drive control circuit 101 and the gate driver circuit 102 cooperate to constitute a motor driving means for driving controllably the motor control bridge circuit 103.

Further, the motor-driven power steering control system is provided with a fail-safe means which is constituted by a shunt resistor 107, a motor current detection circuit 108 and an overcurrent detection circuit 109.

More specifically, a relay 105 is connected to a power source 106 for supplying an electric power to the motor control circuit 103. The shunt resistor 107 is connected between the relay 105 and the motor control bridge circuit 103. The motor current detection circuit 108 is connected across the shunt resistor 107 for detecting a current flowing to the motor 104 on the basis of a voltage appearing across the shunt resistor 107. The overcurrent detection circuit 109 is connected to the motor current detection circuit 108 for detecting the occurrence of an overcurrent state on the basis of the current detection level outputted from the overcurrent detection circuit 109.

In operation, when a large current flows through the assist torque generating motor 104 upon the occurrence of a ground fault, the large current is detected by the motor current detection circuit 108. On the other hand, the overcurrent detection circuit 109 detects the overcurrent state on the basis of the output of the motor current detection circuit 108 and supplies corresponding information to the central processing unit 100 which responds thereto by turning off the relay 105, whereby the power supply to the motor control bridge circuit 103 from the power source 106 is interrupted. Further, operations of the drive control circuit 101 and the gate driver circuit 102 are inhibited in response to the overcurrent state detection signal outputted from the circuit 109.

As is apparent from the above, the reversible motor control system disclosed in JP-A-H4-251596 is designed to detect only the ground fault, and is incapable of detecting other abnormalities which may occur, for example, in the bridge circuit 103 or the control circuits 101 and 102.

FIG. 9 is a block diagram showing generally a structure of the motor-driven power steering control system disclosed in JP-AU-H5-20976. Referring to the figure, this prior art motor-driven power steering control system is comprised of a control unit 200 and a motor control bridge circuit 201 implemented in the form of H-bridge circuit including gate-controlled semiconductor switch elements such as FETs, wherein change-over of the direction in which an assist torque generating reversible motor 202 is to be driven as well as magnitude of torque generated thereby is controlled via the motor control bridge circuit 201 with PWM signals generated by the control unit 200.

Further, first and second current detection circuits 203 and 204 are connected to the motor 202 at upstream and downstream sides thereof, respectively. A fail-safe relay circuit 206 is interposed between the motor control bridge circuit 201 and a power source 205. The current detection circuits 203 and 204 cooperate with the fail-safe circuit 206 to constitute a fail-safe means.

In operation, the current flowing to the reversible motor 202 is detected by the first current detection circuit 203, while a current drained from the reversible motor 202 is detected by the second current detection circuit 204, wherein difference between the outputs of the first and second current detection circuits 203 and 204 is determined by the control unit 200. When the difference mentioned above exceeds a predetermined current value, it is then decided that a ground fault takes place. In that case, the power supply to the motor control bridge circuit 201 from the power source 205 is interrupted by turning off a relay switch incorporated in the fail-safe relay circuit 206.

In the motor-driven power steering control system disclosed in JP-A-H4-251596, the fail-safe means which is comprised of only one motor current detecting circuit 108 for detecting the motor current on the basis of the voltage appearing across the shunt resistor 107 is limited in respect to its abnormality detecting capability. More specifically, with the motor current detecting circuit 108, it is certainly possible to detect a ground fault of the reversible motor 104. However, solely with this circuit 108, it is difficult or impossible to detect the occurrence of an abnormality in the motor driving means constituted by the drive control circuit 101 and the gate driver circuit 102.

In contrast, in the case of the motor-driven power steering control system disclosed in JP-A-H5-20976, there are provided two current detection circuits, i.e., the first and second current detection circuits 203 and 204. Accordingly, the problem mentioned above can certainly be avoided. However, the provision of the two current detection circuits 203 and 204 as indispensable components necessarily leads to high cost and increased scale of the motor-driven power steering control system, giving rise to another problem.

It is further noted that in both of the motor-driven power steering control systems disclosed in JP-A-H4-251596 and JP-UA-H5-20976, validation of the fail-safe function is based on current detection. In other words, the abnormality mentioned above can be detected only in the state where the reversible motor 104 or 202 is actually being driven. Consequently, such abnormality that no PWM signal is outputted due to failure in the gate driver circuit 102 and/or the control unit 200 can not be detected, to another disadvantage.

SUMMARY OF THE INVENTION

In the light of the state of the art described above, it is an object of the present invention to provide a novel and improved motor control apparatus for controlling a reversible motor, which apparatus is capable of protecting the reversible motor not only against a ground fault but also against abnormality which may occur in associated control circuits.

It is another object of the present invention to provide a motor-driven power steering control system in which the motor control apparatus mentioned above is employed and which is imparted with a capability not only for detecting a ground fault of an assist torque generating motor but also coping with abnormality which may occur in a motor driving/control circuit.

A further object of the present invention is to provide a motor-driven power steering control system which can be implemented in an inexpensive structure without incurring any appreciable increase in the manufacturing cost.

In view of the above and other objects which will become apparent as description proceeds, the invention is directed to a motor driving system for driving and controlling the operation of a reversible electric motor, which system includes a DC power source, a switching driver circuit interposed between the DC power source and the reversible motor for driving it switchably between forward and reverse directions, and a control means for controlling the switching driver circuit in response to an input control signal.

In the motor driving system described above, there is provided according to a general aspect of the invention a fail-safe apparatus for preventing the reversible motor from erroneous operation due to the occurrence of a fault in a motor circuit, which apparatus comprises a terminal voltage detecting means connected in parallel to the reversible motor for detecting terminal voltages at both terminals thereof to thereby generate a first detection signal of a first level when both of the terminal voltages are substantially at zero level while generating a second detection signal of second level unless both of the terminal voltages are substantially at zero level, a fail-safe signal generating means connected to an output of the terminal voltage detecting means for generating a fault indication signal in response to the first detection signal, and a switch means connected between the power source and the switching driver circuit, wherein the control means responds to the fault indication signal generated by the fail-safe signal generating means for thereby interrupting power supply to the reversible motor by opening the switch means.

With the arrangement described above, not only the ground fault of the reversible motor but also other abnormalities of the associated control circuitries can be detected by detecting the terminal voltages of the motor. More specifically, upon the occurrence of the abnormality mentioned above, both the terminal voltages of the reversible motor assume substantially zero level. In that case, the terminal voltage detecting means generates a corresponding detection signal, in response to which the fault indication signal is generated and supplied to the control means which may be constituted by a microcomputer. Thus, the latter issues a control signal for interrupting the power supply to the motor. In this manner, the motor can be protected not only against a ground fault but also other abnormalities.

In a preferred mode for carrying out the invention, the switching driver means may be comprised of first and second switching elements and third and fourth switching elements having respective control electrodes connected to the control means and interconnected in the form of an H-bridge circuit such that a first current path for rotating the reversible electric motor in one direction extends from the DC power source via the switch means through the first switching element, the motor and through the second switching element to the ground, while a second current path for rotating the reversible electric motor in the other direction extends from the DC power source via the switch means through the third switching element, the motor and through the fourth switching element to the ground, the terminal voltage detecting means having first and second terminals, the first terminal being connected to a first junction between the first and fourth switching elements and the reversible motor with the second terminal being connected to a second junction between the second and third switching elements and the reversible motor. On the other hand, the terminal voltage detecting means may include a first transistor connected between the first and second terminal so that when voltage applied to the first and second terminals from the first and second junctions, respectively, are both substantially zero, the first transistor outputs the first detection signal for causing the fail-safe signal generating means to generate the fault indication signal. In this connection, the base of the first transistor may be connected to the first and second junctions via a first pair of diodes connected with opposite polarities, respectively, with an emitter thereof being connected to the first and second junctions via a second pair of diodes which are connected in opposite polarities, respectively, and connected in series to the second pair of diodes, respectively, while a collector of the first transistor may be connected to an input terminal of the fail-safe signal generating means.

In another preferred mode for carrying out the invention, the fail-safe signal generating means may be comprised of a second transistor having a base connected to the collector of the first transistor, an emitter grounded and a collector connected to a voltage supply source and serving as an output terminal for delivering the fault indication signal.

With the arrangement described above, the terminal voltage detecting means and the fail-safe signal generating means can be implemented very inexpensively.

In a still another preferred mode for carrying out the invention, the first to fourth switching elements of the H-bridge circuit may be controlled with pulse width modulated signals supplied from the control means, which may include a fetching means for fetching output of the fail-safe signal generating means at a timing at which the switching element(s) constituting the H-bridge circuit is turned on and off with the pulse-width modulated signal.

By virtue of the arrangement, adverse influence of spurious signal components due to switching operations of the switching element can successfully be suppressed.

In a further preferred mode for carrying out the invention, the control means may include a timer means for determining a duration of the fault indication signal, a comparison means for comparing the duration of the fault indication signal with a predetermined reference value, and a trigger means for actuating the switch means to thereby interrupt power supply to the reversible motor via the switching driver means when the duration of the fault indication signal exceeds the reference value.

With the above structure of the control means, the reliability of the fail-safe function can significantly be enhanced. The timer means may be realized by using a counter incorporated inherently in the microcomputer which constitutes the control means.

In a still further preferred mode for carrying out the invention, a fail-safe apparatus may comprise a filtering means interposed between the terminal voltage detection means and the fail-safe signal generating means for suppressing spurious signals possibly generated due to switching operation of the switching elements from being conveyed to the fail-safe signal generating means.

By providing the filter means, spurious signals can positively be suppressed.

In a yet further preferred mode for carrying out the invention, a fail-safe apparatus may comprise a motor current detecting means comprised of a shunt resistor connected between a low potential side of the switching driver means and the ground and voltage/current conversion means connected to the shunt resistor for detecting a voltage appearing across the shunt resistor to thereby convert the voltage to a current signal indicating a current flowing through the reversible motor, wherein the output of the voltage/current conversion means is supplied to the control means to be utilized for a control of the motor. As mentioned previously, the control means may be implemented in the form of a microcomputer. In that case, the fail-safe control routine can be initialized by the microcomputer only when the output of the motor current detecting means indicates that the motor is operating.

The present invention can profitably find application to a motor-driven power steering system of a motor vehicle, which includes an electric reversible motor connected to a steering system of a motor vehicle through electromagnetic clutch means, a motor driving means, a switching drive means for driving the motor in forward or reverse direction under the control of the motor driving means, and a clutch control means for controlling the electromagnetic clutch means. In the motor-driven power steering system mentioned above, there is provided according to a further aspect of the invention a control apparatus which comprises a motor voltage detecting means for detecting terminal voltages at both terminals of the reversible motor for thereby generating a voltage signal of first level and subsequently a fail-safe signal of a second level on the basis of the first-level voltage signal when both of the terminal voltages are approximately zero, while generating a voltage signal of a second level and subsequently a fail-safe signal of a first level on the basis of the second-level voltage signal unless both of the terminal voltages are approximately zero, a switch means connected between an electric power source and the switching drive means and the clutch control means, and a control means for fetching the fail-safe signal from the motor voltage detecting means to thereby open the switch means for interrupting power supply to the electric reversible motor and the clutch control means when the fail-safe signal is at the second level.

The above other objects, features and attendant advantages of the present invention will more clearly be understood by reading the following description of the preferred embodiments thereof taken, only by way of example, in conjunction with the drawings.

DESCRIPTION OF THE PREFERRED EMBODIMENTS

Now, the present invention will be described in detail in conjunction with the preferred or exemplary embodiments thereof by reference to the drawings.

Figure 1:
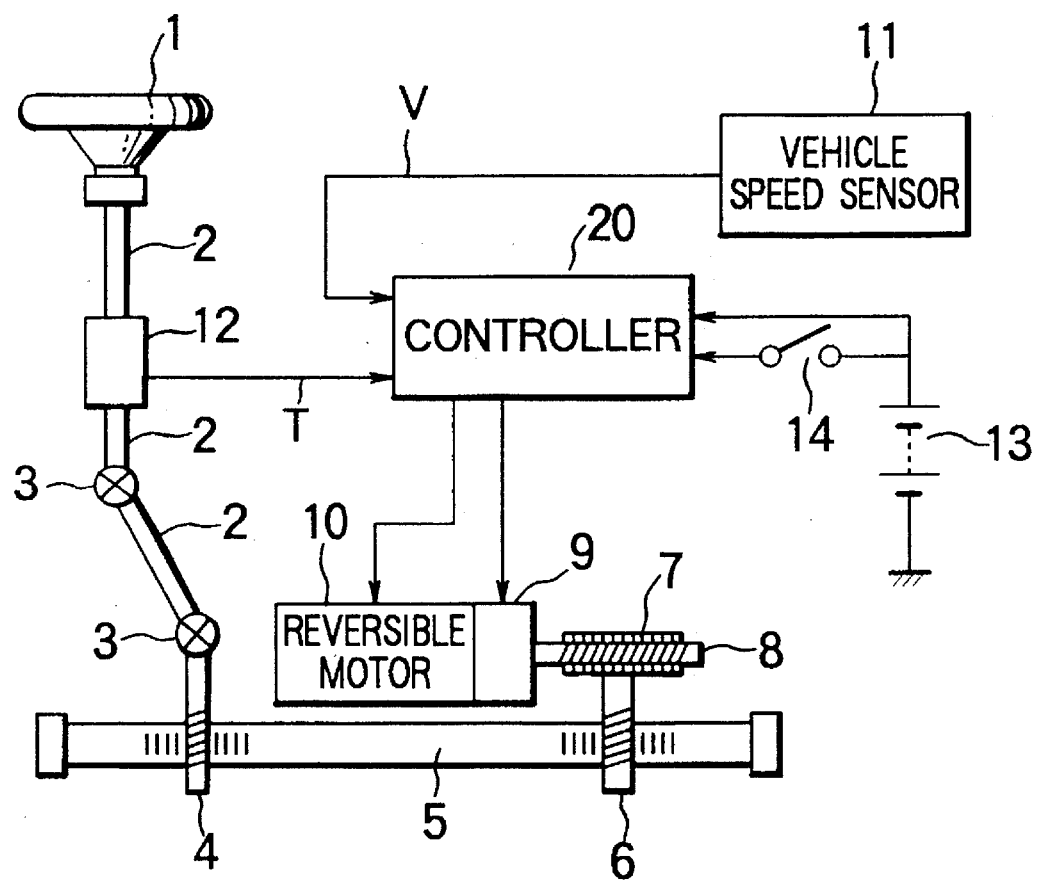
FIG. 1 is a view showing only schematically a typical structure of a motor-driven power steering system to which the present invention can be applied.

At first, a typical motor-driven power steering control system of a motor vehicle to which the invention can be applied will first be described. FIG. 1 shows only schematically a structure of a motor-driven power steering system. Referring to the figure, an assist torque is transmitted to a steering wheel 1 by way of a plurality of steering shafts 2 (hereinafter referred to as the steering shaft assembly) interconnected by universal joints 3. Mounted to a bottom end of the steering shaft assembly 2 is a pinion shaft 4 which is adapted to mesh with a rack 5 at one end portion thereof. Thus, when the rack 5 is moved reciprocatively along the longitudinal axis thereof, the steering shaft assembly 2 is rotated as a whole in the direction which depends on the direction (i.e., rightward or leftward direction as viewed in the figure) in which the rack 5 is moved. Meshing with the rack 5 at the other end portion is a pinion shaft 6 on which a worm wheel 7 is fixedly mounted. The worm wheel 7 meshes with a worm 8 which in turn is coupled to a reversible motor 10 for generating a steering assist torque through an interposed electromagnetic clutch 9.

In operation, when the reversible motor 10 is electrically energized in the state where the electromagnetic clutch 9 is coupled, the worm 8 is rotated, which results in rotation of the worm wheel Y and hence the pinion shaft 6 in the corresponding direction, whereby the rack 5 is caused to move rightwards or leftwards, as viewed in the figure. Thus, the pinion shaft 4 is rotated in the corresponding direction. In this manner, an output torque (referred to as the assist torque) generated by the reversible motor 10 is transmitted to the steering wheel 1 via the rack/worm gear train and the steering shaft assembly 2, to thereby assist a driver of the motor vehicle in his or her manipulation of the steering wheel 1.

The control of the reversible motor 10 for generating the assist torque to be transmitted to the steering shaft assembly 2 and hence the steering wheel 1 is performed by a control apparatus 20. To this end, there are provided a vehicle speed sensor 11 and a torque sensor 12, wherein a vehicle speed signal V outputted by the vehicle speed sensor 11 and a steering torque signal T outputted by the torque sensor 12 are supplied to the control apparatus 20 as control information for controlling the reversible motor 10. The control apparatus 20 is supplied with an electric power from an onboard battery (power source) 13 via a key switch 14 and a conditioning circuit mentioned hereinafter.

Figure 2:
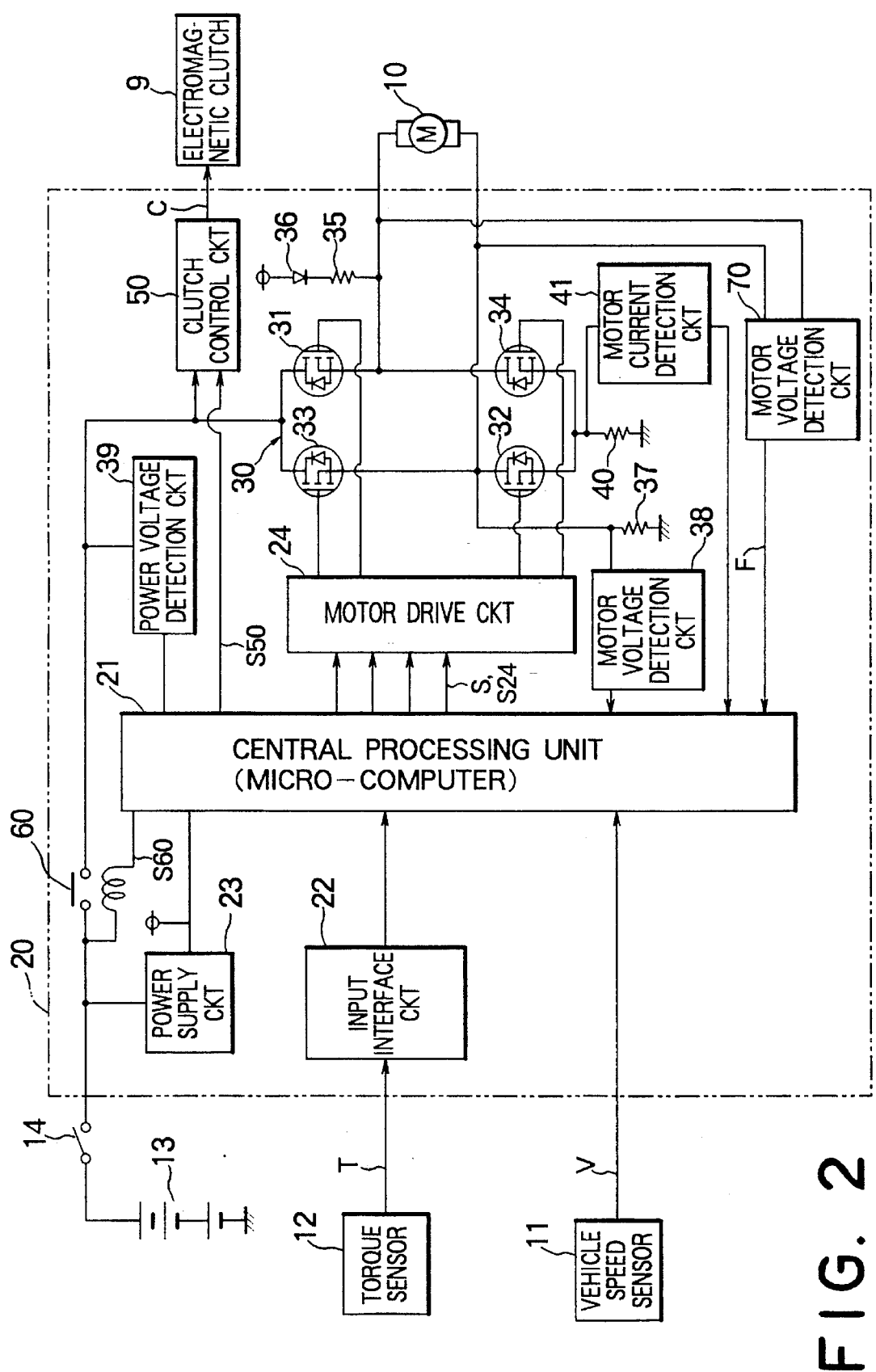
FIG. 2 is a block diagram showing in detail a circuit configuration of a motor-driven power steering control system according to an embodiment of the invention.

Next, description will turn to the control apparatus 20. FIG. 2 is a block diagram showing a circuit configuration of the control apparatus 20. As can be seen in the figure, the control apparatus 20 includes a central processing unit 21 which may be constituted by a microcomputer and which is supplied with the vehicle speed signal V from the vehicle speed sensor 11 and the steering torque signal T from the torque sensor 12 via an input interface circuit 22 and which serves as a control means in the intrinsical sense.

The central processing unit 21 receives power from a power source circuit 23 which is connected to the battery 13. Provided at the output side of the central processing unit 21 is a motor drive circuit 24 which constitutes a motor driving means and which is designed to generate PWM (Pulse Width Modulated) signals S on the basis of a motor drive control signal supplied from the central processing unit 21 which generates the motor drive control signal on the basis of the vehicle speed signal V and the steering torque signal T indicating the direction and magnitude of a torque applied to the steering wheel by the driver. On the other hand, connected to the output side of the motor drive circuit 24 is a H-bridge switching driver circuit 30 which is constituted by controlling swithching elements such as electric field transistors or the like and serves as the switching driving means for controlling the reversible motor 10 on the basis of the PWM signals S generated by the motor drive circuit 24.

More specifically, the H-bridge switching driver circuit 30 is constituted by four FETs (Field Effect Transistors) 31 to 34 having gate electrodes to which the PWM signals S are inputted, respectively, wherein a first series connection of the FETs 31 and 34 is connected in parallel with a second series connection of the FETs 32 and 33. The reversible motor 10 has terminals connected to a junction between the FETs 32 and 33 and a junction between the FETs 31 and 34, respectively. Since the motor drive circuit 24 and the H-bridge switching circuit 30 for controllably driving the reversible motor 10 with the PWM signals are per se known in the art, any further explanation thereof will be unnecessary. It should however be mentioned that the assist torque generating motor 10 is rotated in one direction (e.g. forward direction) when the FETs 31 and 32 are driven (i.e., turned on and off) in response to the PWM signal applied to the gates thereof, wherein magnitude of the torque generated by the reversible motor 10 is determined in dependence on the duty cycle of the PWM signal. In contrast, when the FETs 33 and 34 are driven with the PWM signal, the reversible motor 10 is caused to rotate in the other direction (i.e., in the reverse or backward direction).

Connected to one of the terminals of the assist torque generating motor 10 is a biasing resistor 35 to which a diode 36 is connected in series. The diode 36 has an anode connected to the power supply circuit 23. On the other hand, connected to the other terminal of the reversible motor 10 are a resistor 37 grounded and a terminal voltage detection circuit 38, wherein a terminal voltage of the reversible motor 10 detected by the terminal voltage detection circuit 38 is supplied to the central processing unit 21 as information to be utilized for monitoring the reversible motor 10.

The H-bridge switching driver circuit 30 is connected to the battery 13 at a high-potential side so as to be supplied with a predetermined voltage from the battery 13 serving as the power source, wherein the voltage applied to the H-bridge switching driver circuit 30 is monitored by a supply voltage detection circuit 39. On the other hand, a low-potential side of the H-bridge switching driver circuit 30 is connected to one end of a shunt resistor 40 having the other end grounded. The shunt resistor 40 constitutes a motor current detecting means in cooperation with a motor current detection circuit 41 which is connected in parallel to the shunt resistor 40.

More specifically, the motor current detection circuit 41 detects a voltage making appearance across the shunt resistor 40 to thereby convert the detected voltage to a current signal indicative of a current flowing through the reversible motor 10. The current signal thus generated is supplied to the central processing unit 21 to be utilized for determining whether the motor 10 is operating or not.

The electromagnetic clutch 9 mentioned previously is connected to a clutch control circuit 50 constituting a clutch control means which is controlled by the central processing unit 21 on the basis of the vehicle speed signal V, the steering torque signal T and the motor current signal supplied from the motor current detection circuit 41, as mentioned below. Further, the electromagnetic clutch 9 is adapted to be electrically energized from the battery 13.

The central processing unit 21 controls the clutch control circuit 50 on the basis of the vehicle speed signal V supplied from the vehicle speed sensor 11, the steering torque signal T from the torque sensor 12 and the motor current signal supplied from the motor current detection circuit 41, while the electromagnetic clutch 9 is controlled by a clutch control signal C generated by the clutch control circuit 50 to be thereby coupled or disconnected.

Further provided in association with the control unit 20 is a fail-safe means which is constituted by a relay 60 serving as a change-over means and a motor voltage detection circuit 70 functioning as a terminal voltage detecting means for detecting terminal voltages of the motor 10. The relay 60 is inserted between the battery 13 on one hand and the H-bridge switching driver circuit 30 and the clutch control circuit 50 on the other hand, and is adapted to interrupt power supply to both the H-bridge switching driver circuit 30 and the clutch control circuit 50 under the control of the central processing unit 21 upon the occurrence of an abnormality. The motor voltage detection circuit 70 is so designed as to detect the voltage appearing across the reversible motor 10 to thereby output a fail-safe signal F indicating a predetermined voltage level. The fail-safe signal F is supplied to the central processing unit 21.

Figure 3:
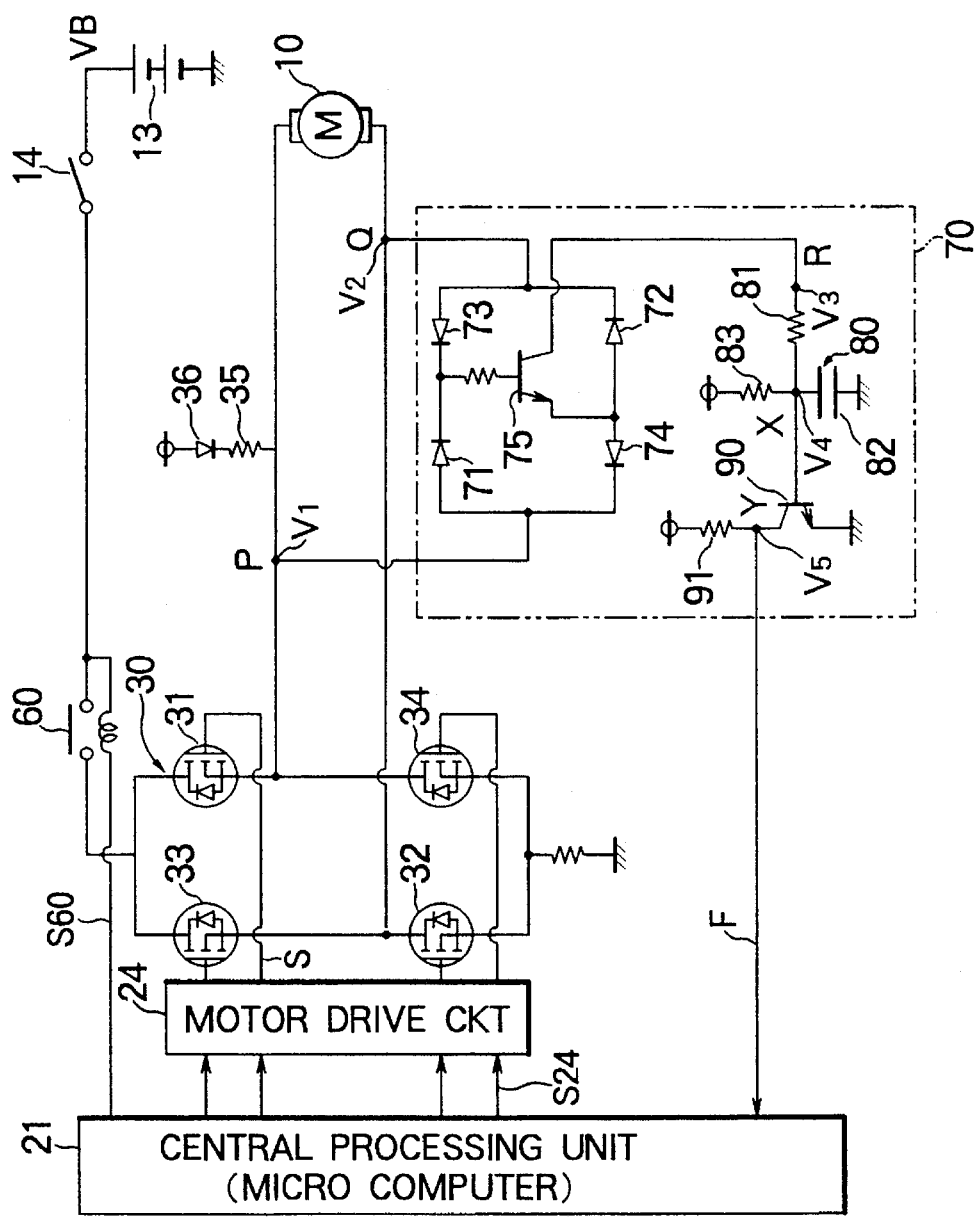
FIG. 3 is a block diagram showing in more detail a circuit configuration of a major portion of the control system shown in FIG. 2.

Now, the motor voltage detection circuit 70 will be described in detail. FIG. 3 shows a circuit configuration of the motor voltage detection circuit 70 in detail. Referring to FIG. 3, the motor voltage detection circuit 70 includes diodes 71 and 74 connected in series, wherein a junction (connecting node) between the anode of the diode 71 and the cathode of the diode 74 is connected to one terminal P of the assist torque generating motor 10. Further, there are provided diodes 73 and 72 connected in series, wherein a junction between the anode of the diode 73 and the cathode of the diode 72 is connected to the other terminal Q of the reversible motor 10. Additionally, a transistor 75 is provided with the base thereof being connected to a junction between the cathodes of the diodes 71 and 73 while the emitter of the transistor 75 is connected to a junction between the anodes of the diodes 72 and 74. The collector of the transistor 75 is connected to a filter circuit generally denoted by a reference numeral 80, which will be described below.

The filter circuit 80 is implemented in the form of a RC-filter circuit which includes a resistor 81 having an input end R connected to the collector of the transistor 75 and a capacitor 82 having one end connected to the output end of the resistor 81. The other end of the capacitor 82 is grounded. A junction X between the resistor 81 and the capacitor 82 of the filter circuit 80 is connected to the power supply circuit 23 (FIG. 2) via a resistor 83 and connected to the base of a transistor 90.

The transistor 90 which constitutes a fail-safe signal generating means has an emitter grounded and a collector connected to the power supply circuit 23 via a resistor 91, wherein a junction Y between the collector of the transistor 90 and the resistor 91 is led to the central processing unit 21. With this circuit configuration, a potential $V_5$ appearing at the junction or circuit point Y which represents the fail-safe voltage assumes a low level when the transistor 90 is conducting (i.e., in the on-state) while the potential $V_5$ becomes high when the transistor 90 is not conducting (i.e., in the off-state). The fail-safe signal F whose potential level charges as mentioned above is delivered from the collector of the transistor 90 to be supplied to the central processing unit 21.

In the central processing unit 21, a temporal period during which the fail-safe signal F having the low potential level is inputted is measured or counted by a timer (not shown). When the duration of the fail-safe signal F of the low potential level exceeds a predetermined period $t_0$, the central processing unit 21 outputs stop signals S24 and S50 (FIG. 2) for stopping operations of the motor drive circuit 24 and the clutch control circuit 50, respectively, together with a switching signal S60 for turning off the relay 60.

Now, the fail-safe operation effected by the motor-driven power steering control system according to the instant embodiment of the invention will be elucidated.

Figure 4:
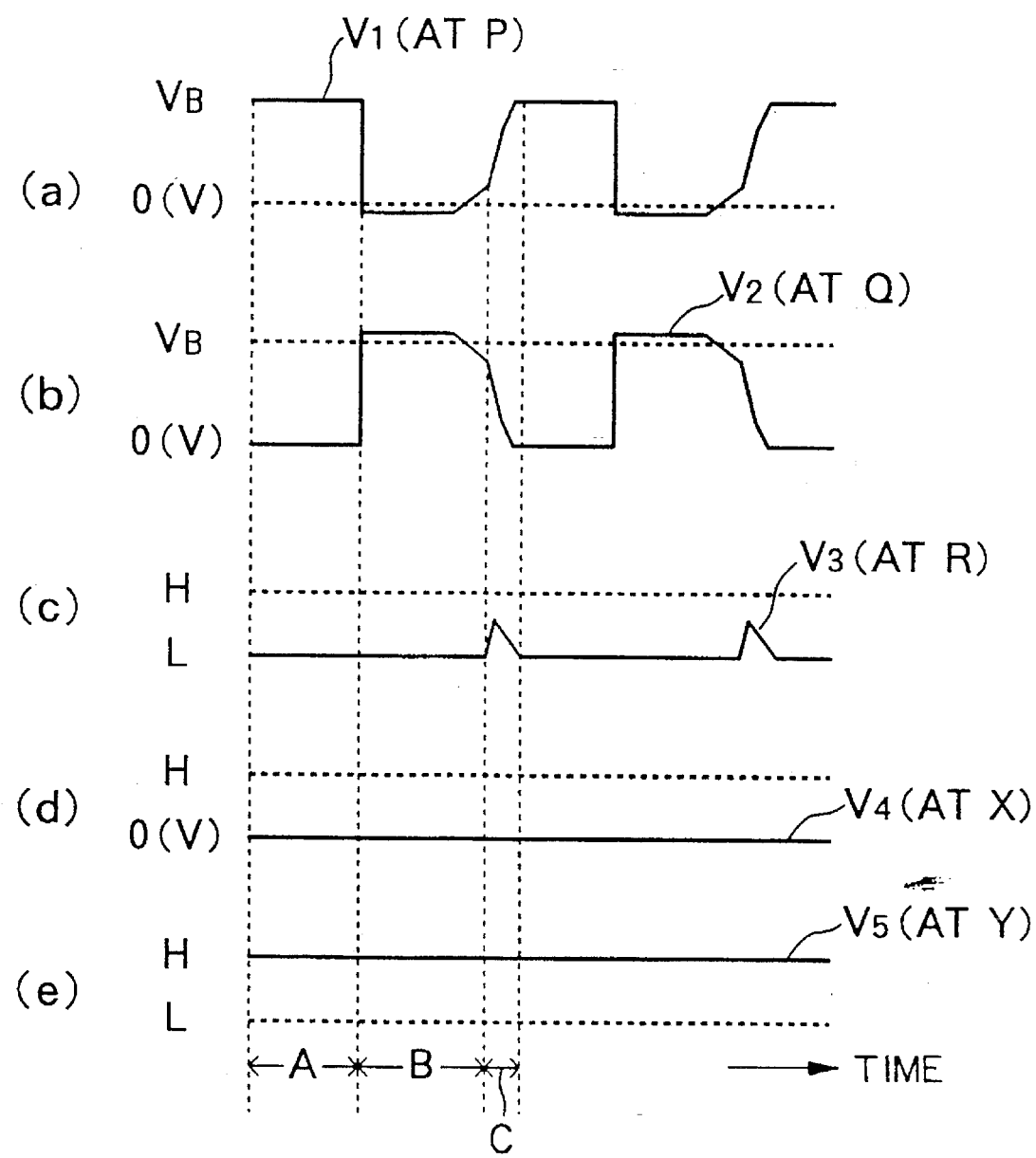
FIG. 4 shows waveforms of voltage signals appearing at various circuit points of the motor-driven power steering control system in a normal state thereof.
Figure 5:
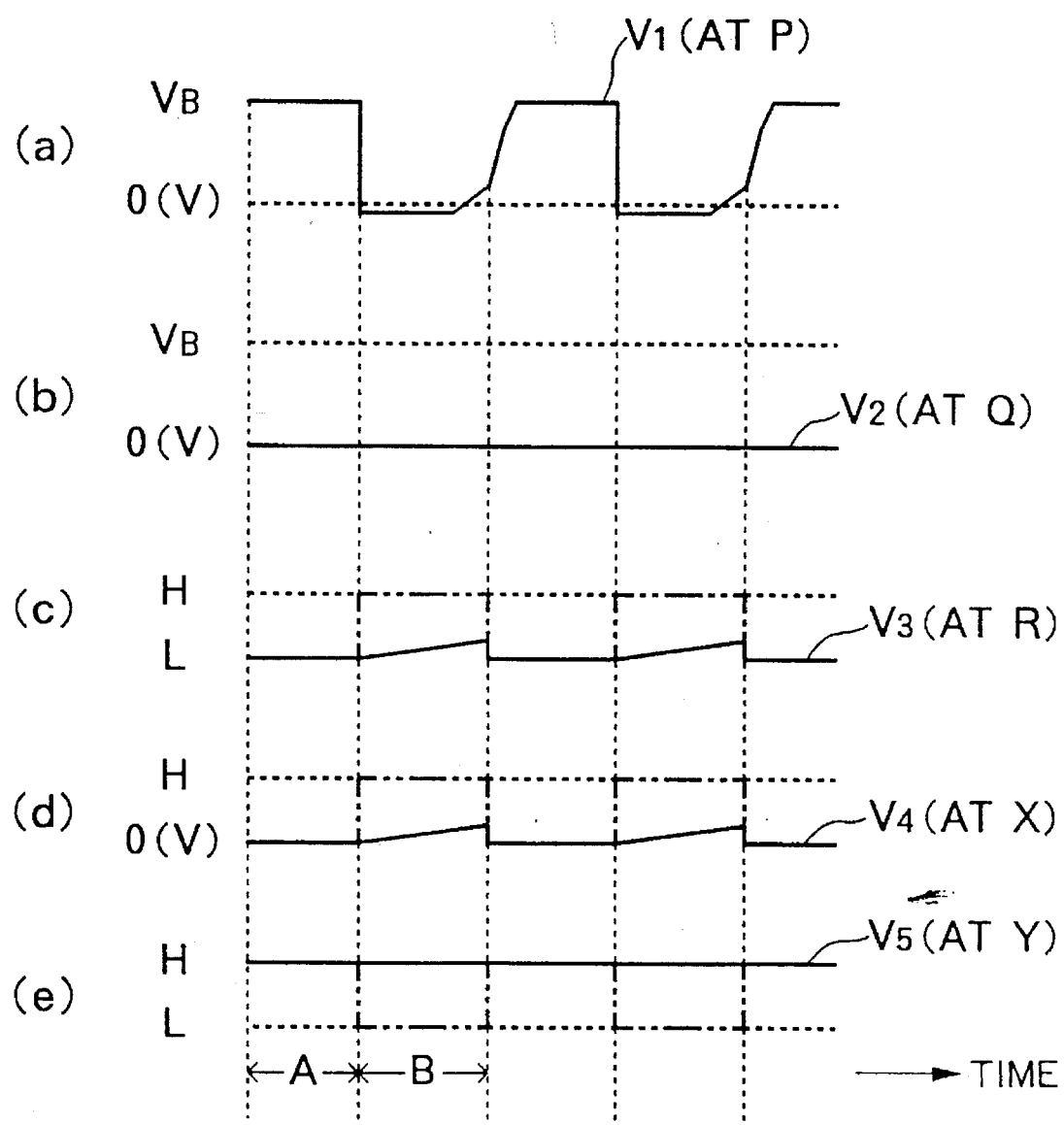
FIG. 5 shows waveforms of the voltage signals corresponding to those shown in FIG. 4 on the assumption that a filter circuit is not provided.
Figure 6:
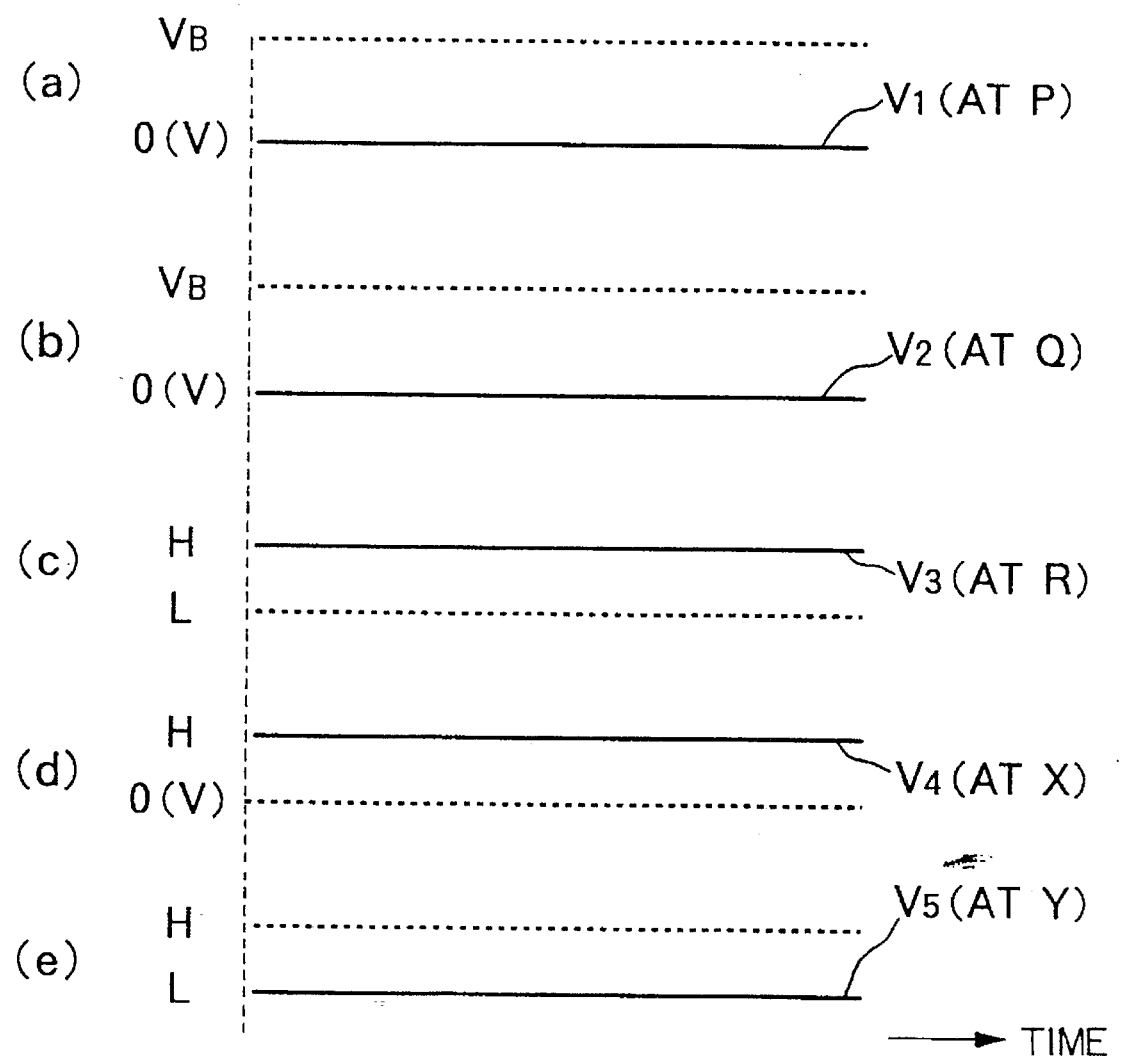
FIG. 6 shows waveforms of the corresponding signals upon occurrence of abnormality.

FIG. 4 shows waveforms of voltage signals appearing at various circuit points of the motor-driven power steering control system in a normal operation state thereof. FIG. 5 shows waveforms of the corresponding voltage signals on the assumption that the filter circuit mentioned above is not provided. FIG. 6 shows waveforms of the corresponding signals upon occurrence of abnormality. Furthermore, FIG. 7 is a flow chart for illustrating a fail-safe operation performed by the control processing unit 21.

Figure 7:
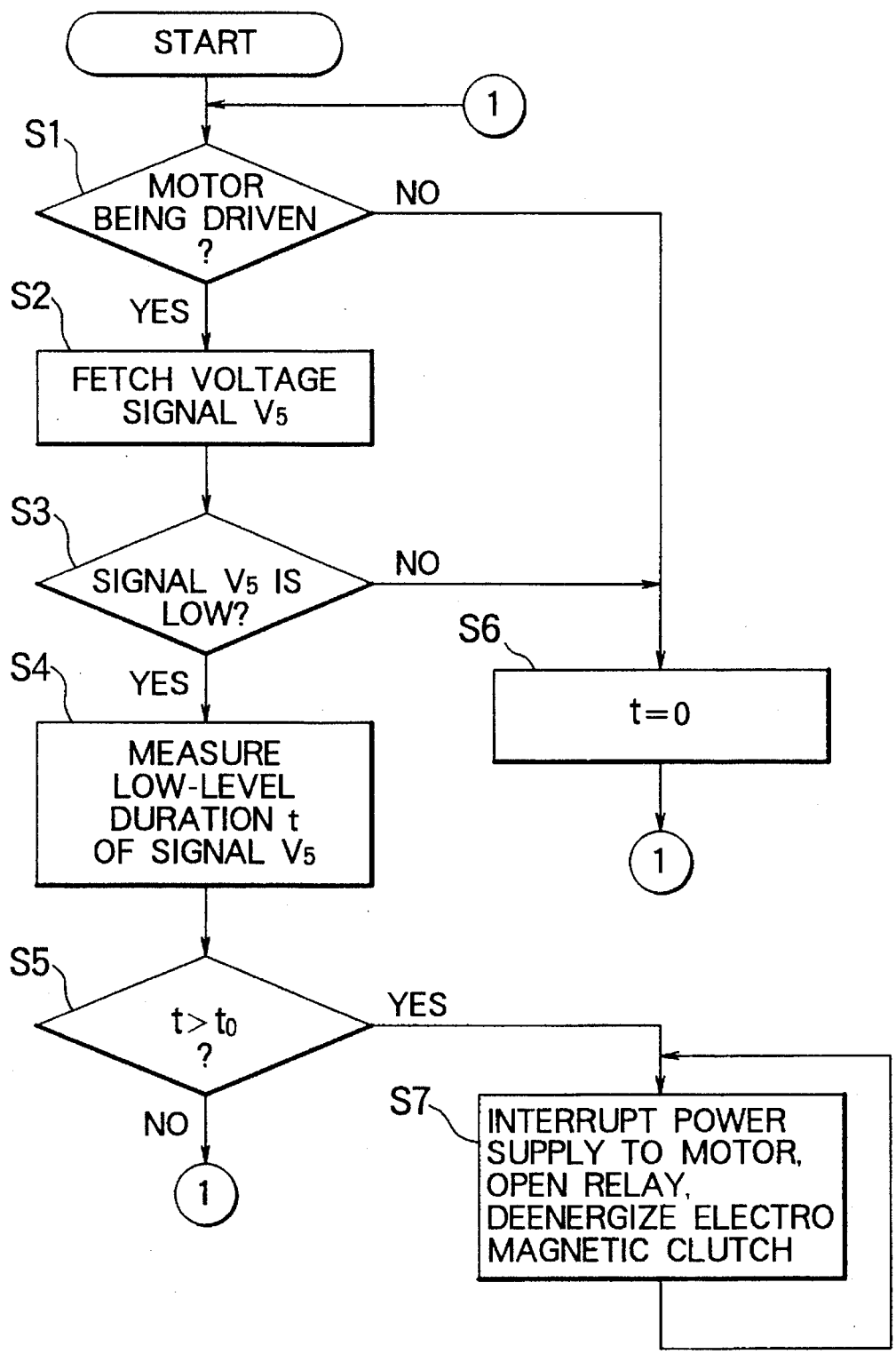
FIG. 7 is a flow chart for illustrating a fail-safe function realized by a central control unit which may be constituted by a microcomputer.
Figure 8:
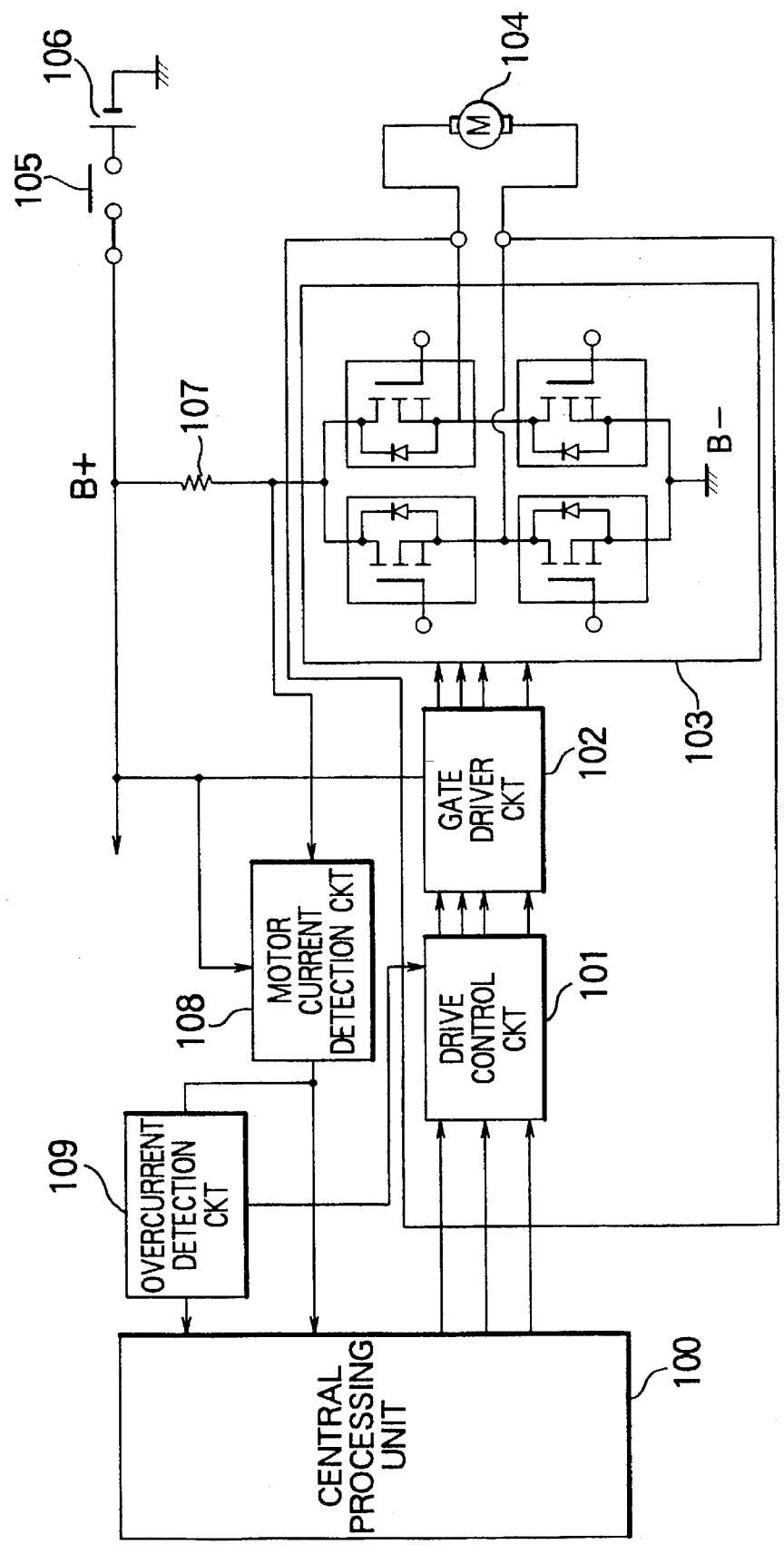
FIG. 8 is a block diagram showing generally a structure of a conventional motor-driven power steering control system.
Figure 9:
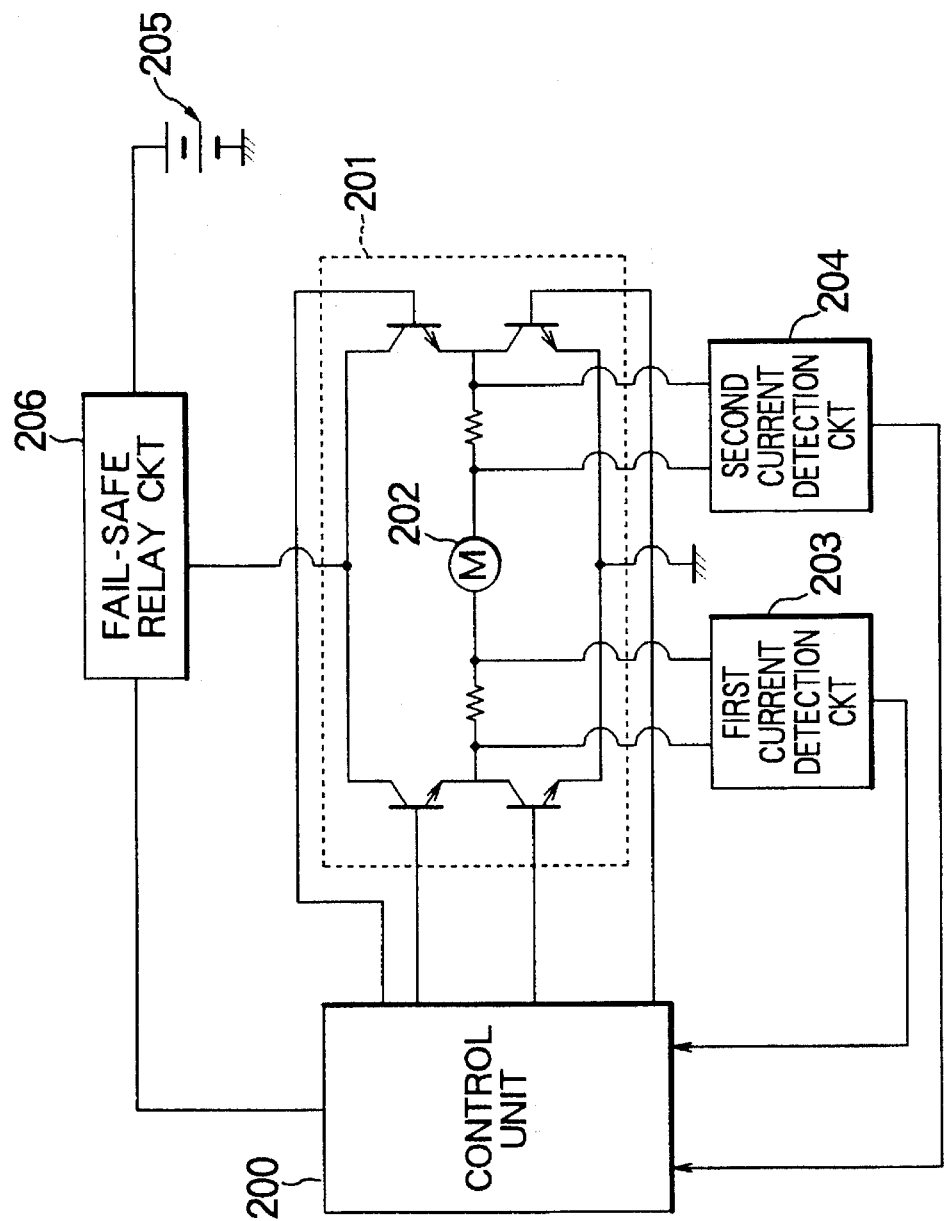
FIG. 9 is a block diagram showing schematically a structure of another type motor-driven power steering control system known heretofore.

In a step S1 shown in FIG. 7, decision as to whether or not the assist torque generating motor 10 is being driven is made by the central processing unit 21 on the basis of the outputs of the motor terminal voltage detection circuit 38 and the motor current detection circuit 41. When the decision step S1 results in negation (NO), indicating that the reversible motor 10 is not being driven, the timer (not shown) incorporated in the central processing unit 21 is reset in a step S6 (FIG. 7), which is again followed by execution of the decision step S1.

In contrast, when it is decided in the step S1 that the reversible motor 10 is being driven (i.e., when the answer of the decision step S1 is "YES"), the following processing operation is carried out.

It is now assumed that the reversible motor 10 is normally rotating in the forward direction. In that case, the FETs S1 and 82 of the H-bridge switching driver circuit 30 are turned on and off in response to the PWM signals applied to the gates thereof from the motor drive circuit 24. As a consequence of this, the waveform of the voltage signal $V_1$ appearing at the circuit point P changes in such a manner as illustrated at (a) in FIG. 4.

More specifically, when the FETs 31 and 32 are in the on-state, the potential level $V_1$ at the circuit point P is substantially at a supply voltage level $V_B$ of the battery 13 during an interval A, as shown in FIG. 4 at (a). In contrast, when the FETs 31 and 32 are in the off-state, the voltage $V_1$ at the circuit point P is substantially at zero during an interval B, while the voltage $V_2$ at the circuit point Q rises up due to back electromotive force of the reversible motor 10, as shown in FIG. 4 at (b). When the FETs 31 and 32 are again turned on, the voltage $V_1$ at the circuit point P assumes the source voltage level with the voltage $V_2$ at the circuit point Q lowering to the level of approximately zero. In this conjunction, it should be noted that the voltage $V_1$ does not rise up steeply but with a slope or gradient (see an interval C shown in FIG. 4 at (a)).

Consequently, when the FETs 31 and 32 are conducting or in the on-state during the interval A, the voltage $V_1$ at the circuit point P is at the source voltage level $V_B$ while the voltage $V_2$ at the circuit point Q is substantially zero, as shown at (b) in FIG. 4, because this circuit point Q is grounded via the FET 32. As a result of this, a current flows along a path extending via the diode 71, the transistor 75 and the diode 72 to the circuit point Q, whereby the transistor 75 is turned on with the collector voltage thereof (i.e., the voltage $V_3$ at the circuit point R) assuming a low potential level (L-level), as shown at (c) in FIG. 4. Thus, the voltage $V_4$ at the circuit point X becomes low (L-level), as shown at (d) in FIG. 4, whereby the transistor 90 is turned off with the collector voltage thereof and hence the voltage $V_5$ at the circuit point Y assuming a high potential level (H-level), as shown at (e) in FIG. 4. This means that the fail-safe signal F is at high (H) level.

On the other hand, when the FET 31 and the FET 32 are in the off-state during the interval B, the voltage $V_1$ at the circuit point P becomes approximately zero. On the other hand, the voltage $V_2$ at the circuit point Q assumes a voltage level corresponding to the supply voltage $V_B$ owing to the back electromotive force of the reversible motor 10. Thus, a current now flows along a path extending via the diode 73, the transistor 75 and the diode 74 to the circuit point P, whereby the transistor 75 is turned on with the collector voltage thereof (i.e., the voltage $V_3$ at the circuit point R) remaining at low level (L) as in the case where the FETs 31 and 32 are in the on-state, as shown at (c) in FIG. 4. As a result, the voltage $V_4$ at the circuit point X is also low, as shown at (d) in FIG. 4, which causes the transistor 90 to be held in the off-state, resulting in that the voltage $V_5$ at the circuit point Y is high (H) with the fail-safe signal F being at a high level (H), as shown at (e) in FIG. 4.

As pointed out previously, when the current flowing through the FETs 31 and 32 upon turning-on thereof rises up with a slope more or less, as shown at (a) in FIG. 4 (see the interval C), i.e., when the time required for switching on the FETs 31 and 32 is relatively long, the voltage $V_1$ at the circuit point P transiently assumes a same level as the voltage $V_2$ at the circuit point Q as shown at (a) and (b) in FIG. 4, whereby the transistor 75 becomes non-conducting only temporarily or momentarily. As a result of this, the voltage $V_3$ at the circuit point R temporarily becomes high during the interval C, as shown at (c) in FIG. 4. However, since this transiently high level is filtered out by the filter circuit 80, the voltage $V_4$ at the circuit point X is at a low level (L), as shown at (d) in FIG. 4. Thus, the transistor 90 can remain in the off-state with the voltage $V_5$ at the circuit point Y being high (H), as shown at (e) in FIG. 4, regardless of transient turning-on of the transistor 75.

For controlling the reversible motor 10, it is equally conceivable to repetitively turn on and off the FET 31 in response to the PWM signal with the FET 32 being maintained in the conducting state. In that case, the voltage $V_1$ at the circuit point P, the voltage $V_2$ at the circuit point Q and the voltage $V_3$ at the circuit point R behave in such manners as illustrated in FIG. 5 at (a), (b) and (c), respectively. As can be seen, the voltage $V_4$ at the circuit point X continues to be at a low potential level owing to the presence of the filter circuit 80. Thus, the voltage $V_5$ at the circuit point Y is maintained at high level, as shown at (e) in FIG. 5.

Further, when the reversible motor 10 is normally rotating in the reverse direction, the FETs 33 and 34 of the H-bridge switching driver circuit 30 are controlled by the PWM signals, and the voltage $V_5$ at the circuit point Y is held at the high potential (H), as in the case of the motor operation in the forward direction described above.

Now, let's suppose that a ground fault occurs at the power supply side of the assist torque generating reversible motor 10 or alternatively that the PWM signals S are not outputted from the motor drive circuit 24 due to the occurrence of some abnormality. In that case, both the voltages $V_1$ and $V_2$ at the circuit points P and Q become approximately zero volt, as shown in FIG. 6 at (a) and (b), respectively. As a consequence, the transistor 75 is turned off with the voltage $V_3$ at the circuit point R assuming high potential level (H), as shown at (c) in FIG. 6, which in turn results in the voltage $V_4$ at the circuit point X becoming high (H), as shown at (d) in FIG. 6, whereby the transistor 90 is turned on. Thus, the voltage $V_5$ at the circuit point Y becomes low (L), as shown at (e) in FIG. 6.

The voltage $V_5$ at the circuit point Y as detected by the motor voltage detection circuit 70 is fetched by the central processing unit 21 as the fail-safe signal F, whereon it is checked by the central processing unit 21 whether or not the fail-safe signal F indicates a low potential level in steps S2 and S3 of FIG. 7. When it is decided by the central processing unit 21 that the fail-safe signal F indicates a high potential level, the timer mentioned hereinbefore is reset, which is then followed by the decision based on the output of the motor current detection circuit 41 as to whether the reversible motor 10 is being driven (see FIG. 7, steps S6 and S1 executed when the step S3 results in negation "NO").

In contrast, when it is determined that the fail-safe signal F indicates the low potential level, the time t for which the fail-safe signal F is continuously inputted to the central processing unit 21 is measured by the aforementioned timer, whereupon comparison between the measured time t and a predetermined reference time $t_0$ is performed (FIG. 7, steps S4 and S5).

When the duration t of the fail-safe signal F is shorter than the reference time $t_0$, decision is again made whether or not the reversible motor 10 is being driven (see step S1 which is executed when the step S5 results in "NO").

On the other hand, when the duration t of the fail-safe signal F is longer than the reference time $t_0$, the central processing unit 21 outputs the stop signals S24 and S50 to the motor drive circuit 24 and the clutch control circuit 50, respectively, whereby operations of the motor drive circuit 24 and the clutch control circuit 50 are interrupted. Additionally, a stop signal S60 is also supplied to the relay device 60 which is then broken (see step S7 of FIG. 5 which is executed when the step S5 results in "NO").

As can now be appreciated, when the ground fault occurs at the power supply side of the reversible motor 10 or when an abnormality takes place in the motor drive circuit 24, operations of the motor drive circuit 24, the H-bridge switching driver circuit 30 and the clutch control circuit 50 are immediately stopped with the relay device 60 being switched off, whereby the voltage supply to the H-bridge switching driver circuit 30 and the clutch control circuit 50 is interrupted.

As is apparent from the foregoing, owing to the fail-safe control feature incarnated in the motor-driven steering control system according to the instant embodiment of the invention, not only a ground fault of the reversible motor 10 but also an abnormality of the motor drive circuit 24 can be coped with without the need for providing the motor current detection circuit 41 in duplicate. The motor-driven steering control system can thus be implemented inexpensively.

At this juncture, it should be mentioned that the filter circuit 80 is not necessarily required and may be spared. More specifically, by shortening the switching time for the FETs 31 to 34 so that the voltage $V_1$ appearing at the circuit point P during the interval C shown at (a) in FIG. 4 rises up more steeply to thereby prevent the transistor 75 from being turned off momentarily, the filter circuit 80 can be rendered unnecessary.

Besides, by adopting such arrangement that the fail-safe signal F is fetched by the central processing unit 21 at a timing at which the FET 31 (or FET 33) is turned on in response to the PWM signal, the filter circuit 80 can be spared. More specifically, in the case where the filter circuit 80 is not provided, waveforms of the voltage $V_3$ and $V_4$ at the circuit points R and X during the interval B will be such as illustrated by double-dotted broken line curves in FIG. 5 at (c) and (d), respectively. During this interval B, the potential $V_5$ at the circuit point Y becomes low. However, by fetching the fail-safe signal F at the timing mentioned above, the fail-safe signal F indicating only the high-level voltage $V_5$ during the interval A can be fetched, whereby an erroneous decision can be evaded so long as the reversible motor 10 and the control unit 20 operate normally. Parenthetically, upon the occurrence of an abnormality in the reversible motor 10 and the motor drive circuit 24, the potential $V_5$ at the circuit point Y continues to remain at a low level, as illustrated in FIG. 6. Accordingly, an abnormality decision can be made without fail.

Many features and advantages of the present invention are apparent form the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described.

By way of example, although the invention has been described in conjunction with the control of a reversible motor for the power steering system of a motor vehicle, the principle underlying the present invention can find application for protecting an electric reversible motor driven through a PWM switching circuit in general.

Accordingly, all suitable modifications and equivalents may be resorted to, falling within the scope of the invention.

We claim:

1. In a motor driving system for driving and controlling the operation of a reversible electric motor, which system includes a DC power source, a switching driver circuit interposed between said DC power source and said electric reversible motor for driving said reversible motor switchably between forward and reverse directions, and control means for controlling said switching driver circuit in response to a command signal, a fail-safe apparatus for preventing said electric reversible motor from erroneous operation due to the occurrence of a fault in a motor circuit during periods when said motor is being operatively driven, said fail-safe apparatus comprising:

a) terminal voltage detecting means connected in parallel to said reversible motor for detecting terminal voltages at both terminals of said reversible motor to thereby generate a first detection signal of a first level when both of said terminal voltages are substantially at a zero level and generating a second detection signal of a second level when both of said terminal voltages are not substantially at a zero level;

b) fail-safe signal generating means connected to an output of said terminal voltage detecting means for generating a fault indication signal in response to said first detection signal; and c) switch means connected between said power source and said switching driver circuit;

d) wherein said control means responds to said fault indication signal generated by said fail-safe signal generating means by interrupting power supply to said switching driver circuit means by opening said switch means.

2. A fail-safe apparatus for a motor driving system according to claim 1, wherein said switching driver means comprises first and second switching elements and third and fourth switching elements having respective control electrodes connected to said control means and interconnected in an H-bridge circuit such that a first current path for rotating said reversible electric motor in one direction extends from said DC power source via said switch means through said first switching element, said motor and through said second switching element to the ground, while a second current path for rotating said reversible electric motor in the other direction extends from said DC power source via said switch means through said third switching element, said motor and through said fourth switching element to the ground, and said terminal voltage detecting means comprises first and second input terminals, said first input terminal being connected to a first junction between said first and fourth switching elements and one terminal of said reversible motor, and said second input terminal being connected to a second junction between said second and third switching elements and another, opposite terminal of said reversible motor, and a first voltage detection circuit connected between said first and second input terminals so that when voltages applied thereto from said first and second junctions, respectively, are both substantially zero, said first voltage detection circuit outputs said first detection signal for causing said fail-safe signal generating means to generate said fault indication signal.

3. A fail-safe apparatus for a motor driving system according to claim 2, wherein said first voltage detection circuit is comprised of a first transistor having a base connected to said first and second junctions via a first pair of diodes connected with opposite polarities, respectively, an emitter connected to said first and second junctions via a second pair of diodes connected in opposite polarities, respectively, and connected in series to said second pair of diodes, respectively, and a collector connected to an input terminal of said fail-safe signal generating means.

4. A fail-safe apparatus for a motor driving system according to claim 3, wherein said fail-safe signal generating means is comprised of a second transistor having a base connected to said collector of said first transistor, an emitter grounded and a collector connected to a voltage supply source and serving as an output terminal for delivering said fault indication signal.

5. A fail-safe apparatus for a motor driving system according to claim 2, wherein said first to fourth switching elements of said H-bridge circuit are controlled with pulse width modulated signals supplied from said control means, said control means includes:

fetching means for fetching output of said fail-safe signal generating means at a timing at which said switching element(s) constituting said H-bridge circuit is turned on and off with said pulse-width modulated signal.

6. A fail-safe apparatus for a motor driving system according to claim 1, wherein said control means includes:
  timer means for determining a duration of said fault indication signal;
  comparison means for comparing the duration of said fault indication signal with a predetermined reference value; and
  trigger means for actuating said switch means to thereby interrupt power supply to said reversible motor via said switching driver means when the duration of said fault indication signal exceeds said reference value.

7. A fail-safe apparatus for a motor driving system according to claim 1, further comprising:
  filtering means interposed between said terminal voltage detection means and said fail-safe signal generating means for preventing spurious signals possibly generated due to switching operation of said switching elements from being conveyed to said fail-safe signal generating means.

8. A fail-safe apparatus for a motor driving system according to claim 1, further comprising:
  motor current detecting means comprised of a shunt resistor connected between a low potential side of said switching driver means and the ground and voltage/current conversion means connected to said shunt resistor for detecting a voltage appearing across said shunt resistor to thereby convert said voltage to a current signal indicating a current flowing through said reversible motor,
  wherein output of said voltage/current conversion means is supplied to said control means to be utilized for deciding whether said motor is being operated.

9. A fail-safe apparatus for a motor driving system according to claim 8, said control means being implemented in the form of a microcomputer,
  wherein fail-safe control operation is initialized by said microcomputer only when output of said motor current detecting means indicates that said motor is operating.

10. A motor-driven power steering control system of a motor vehicle for assisting a driver in manipulating a steering wheel by making use of an assist torque generated by a reversible motor which is operatively coupled to a steering mechanism of said motor vehicle, comprising:
  a) electromagnetic clutch means for disconnectably coupling an output of said reversible motor to said steering mechanism;
  b) clutch control means for controlling operation of said electromagnetic clutch means;
  c) torque sensor means for detecting a steering torque applied to said steering wheel by the driver to thereby generate a steering torque signal;
  d) vehicle speed sensor means for detecting a speed of said motor vehicle to thereby generate a vehicle speed signal;
  e) control means for generating a control signal on the basis of said steering torque signal and said vehicle speed signal;
  f) DC power source means supplying electric energy to said reversible motor and said electromagnetic clutch means via said clutch control means;
  g) switching driver circuit means interposed between said DC power source means and said reversible motor for controlling said reversible motor in accordance with said control signal;
  h) relay switch means interposed between said DC power source means on one hand and said electromagnetic clutch means and said switching driver circuit means on the other hand;
  i) terminal voltage detecting means connected in parallel to said reversible motor for detecting terminal voltages at both terminals of said reversible motor to thereby generate a first detection signal of a first level when both of said terminal voltages are substantially at a zero level and generating a second detection signal of a second level when both of said terminal voltages are not substantially at a zero level; and
  j) fail-safe signal generating means connected to an output of said terminal voltage detecting means for generating a fault indication signal in response to said first detection signal;
  k) wherein said control means responds to said fault indication signal generated by said fail-safe signal generating means by interrupting power supply to said electromagnetic clutch means via said clutch control means and power supply to said switching driver circuit means by opening said relay switch means.

11. A motor-driven power steering control system of a motor vehicle according to claim 10, wherein said switching driver means comprises first and second switching elements and third and fourth switching elements having respective control electrodes connected to said control means and interconnected in an H-bridge circuit such that a first current path for rotating said reversible electric motor in one direction extends from said DC power source via said switch means through said first switching element, said motor and through said second switching element to the ground, while a second current path for rotating said reversible electric motor in the other direction extends from said DC power source via said switch means through said third switching element, said motor and through said fourth switching element to the ground, and said terminal voltage detecting means comprises first and second input terminals, said first input terminal being connected to a first junction between said first and fourth switching elements and one terminal of said reversible motor, and said second input terminal being connected to a second junction between said second and third switching elements and another, opposite terminal of said reversible motor, and a first voltage detection circuit connected between said first and second input terminals so that when voltages applied thereto from said first and second junctions, respectively, are both substantially zero, said first voltage detection circuit outputs said first detection signal for causing said fail-safe signal generating means to generate said fault indication signal.

12. A motor-driven power steering control system of a motor vehicle according to claim 11, wherein said first voltage detection circuit is comprised of a first transistor having a base connected to said first and second junctions via a first pair of diodes connected with opposite polarities, respectively, an emitter connected to said first and second junctions via a second pair of diodes connected in opposite polarities, respectively, and connected in series to said second pair of diodes, respectively, and a collector connected to an input terminal of said fail-safe signal generating means.

13. A motor-driven power steering control system of a motor vehicle according to claim 12, wherein said fail-safe signal generating means is comprised of a second transistor having a base connected to said collector of said first transistor, an emitter grounded and a collector connected to a voltage supply source and serving as an output terminal for delivering said fault indication signal.

14. A motor-driven power steering control system of a motor vehicle according to claim 11, wherein said first to fourth switching elements of said H-bridge circuit are controlled with pulse width modulated signals supplied from said control means, said control means includes:

fetching means for fetching output of said fail-safe signal generating means at a timing at which said switching element(s) constituting said H-bridge circuit is turned on and off with said pulse-width modulated signal.

15. A motor-driven power steering control system of a motor vehicle according to claim 10, wherein said control means includes:

timer means for determining a duration of said fault indication signal;

comparison means for comparing the duration of said fault indication signal with a predetermined reference value; and trigger means for actuating said switch means to thereby interrupt power supply to said reversible motor via said switching driver means when the duration of said fault indication signal exceeds said reference value.

16. A motor-driven power steering control system of a motor vehicle according to claim 10, further comprising:

filtering means interposed between said terminal voltage detection means and said fail-safe signal generating means for preventing spurious signals possibly generated due to switching operation of said switching elements from being conveyed to said fail-safe signal generating means.

17. A motor-driven power steering control system of a moter vehicle according to claim 10, further comprising:

motor current detecting means comprised of a shunt resistor connected between a low potential side of said switching driver means and the ground and voltage/current conversion means connected to said shunt resistor for detecting a voltage appearing across said shunt resistor to thereby convert said voltage to a current signal indicating a current flowing through said reversible motor, wherein output of said voltage/current conversion means is supplied to said control means to be utilized for deciding whether said motor is being operated.

18. A motor-driven power steering control system of a motor vehicle according to claim 17, said control means being implemented in the form of a microcomputer, wherein fail-safe control operation is initialized by said microcomputer only when output of said motor current detecting means indicates that said motor is operating.

19. A control apparatus for a motor-driven power steering system of a motor vehicle, wherein said power steering system includes an electric reversible motor connected to a steering system of a motor vehicle through electromagnetic clutch means, motor driving means, switching drive means for driving said electric reversible motor in forward or reverse directions under the control of said motor driving means, and clutch control means for controlling said electromagnetic clutch means;

said control apparatus comprising:

motor voltage detecting means for detecting terminal voltages at both terminals of said electric reversible motor during normal operation thereof for thereby generating a voltage signal of a high level and subsequently a fail-safe voltage signal of a low level on the basis of said high-level voltage signal when both of said terminal voltages are approximately zero, while generating a voltage signal of a low level and subsequently a fail-safe voltage signal of a high level on the basis of said low-level voltage signal when both of said terminal voltages are not approximately zero;

switch means connected between an electric power source and said switching drive means and said clutch control means; and control means for fetching said fail-safe voltage signal from said motor voltage detecting means to thereby open said switch means to interrupt power supply to said electric reversible motor and said clutch control means when said fail-safe voltage signal is at said low level.

20. A motor-driven power steering control apparatus according to claim 19, wherein said motor voltage detection means includes filtering means for eliminating a spurious voltage component of high level which may possibly be contained in said low-level voltage signal even when said terminal voltages of said electric reversible motor are not approximately zero.

21. A motor-driven power steering control apparatus according to claim 20, further comprising:

a shunt resistor connected to a low potential side of said switching drive means for detecting a motor current flowing through said electric reversible motor; and motor current detecting meads for detecting said motor current on the basis of a voltage appearing across said shunt resistor.

22. A motor-driven power steering control apparatus according to claim 20, wherein when said low-level fail-safe voltage signal as fetched by said control means continues longer than a predetermined time, said control means opens said switch means for thereby interrupting power supply to said electric reversible motor and said clutch control means.

23. A motor-driven power steering control apparatus according to claim 19, further comprising:

a shunt resistor connected to a low potential side of said switching drive means for detecting a motor current flowing through said electric reversible motor; and motor current detecting means for detecting said motor current on the basis of a voltage appearing across said shunt resistor.

24. A motor-driven power steering control apparatus according to claim 21, wherein when said low-level fail-safe voltage signal as fetched by said control means continues longer than a predetermined time, said control means opens said switch means for thereby interrupting power supply to said electric reversible motor and said clutch control means.

25. A motor-driven power steering control apparatus according to claim 19, wherein when said low-level fail-safe voltage signal as fetched by said control means continues longer than a predetermined time, said control means opens said switch means for thereby interrupting power supply to said electric reversible motor and said clutch control means.

* * * * *